US008623129B2

(12) United States Patent
Paris et al.

(10) Patent No.: US 8,623,129 B2
(45) Date of Patent: Jan. 7, 2014

(54) COATING AGENT

(76) Inventors: Laurence Paris, Montmarault (FR); Frédéric Vaures, Avrainville (FR)

( * ) Notice: Subject to any disclaimer, the term of this patent is extended or adjusted under 35 U.S.C. 154(b) by 821 days.

(21) Appl. No.: 12/091,745

(22) PCT Filed: Oct. 26, 2006

(86) PCT No.: PCT/FR2006/051114
§ 371 (c)(1),
(2), (4) Date: Feb. 11, 2010

(87) PCT Pub. No.: WO2007/048982
PCT Pub. Date: May 3, 2007

(65) Prior Publication Data
US 2010/0126381 A1    May 27, 2010

(30) Foreign Application Priority Data

Oct. 28, 2005  (FR) ..................... 05 53294

(51) Int. Cl.
*C09D 103/00* (2006.01)
*C09D 103/08* (2006.01)

(52) U.S. Cl.
CPC ............ *C09D 103/00* (2013.01); *C09D 103/08* (2013.01)
USPC .................. 106/209.1; 106/212.1; 106/215.3; 106/215.4; 106/215.5; 106/217.01; 106/217.3

(58) Field of Classification Search
USPC .......... 106/209.1, 212.1, 215.3, 215.4, 215.5, 106/217.01, 217.3
See application file for complete search history.

(56) References Cited

U.S. PATENT DOCUMENTS

| 4,026,986 A | 5/1977 | Christen et al. |
| 2004/0069300 A1 | 4/2004 | Roversi |

FOREIGN PATENT DOCUMENTS

FR    2 862 654 A1    5/2005

OTHER PUBLICATIONS

Converti et al, Estimation of viscosity of highly viscous fermentation media containing one or more solutes, Biochemical Engineering Journal, (1999), pp. 81-85.*
International Search Report, Mar. 21, 2007, from International Phase of the instant application.
English Translation of International Preliminary Report on Patentability Chapter II, Sep. 3, 2008, from International Phase of the instant application.

* cited by examiner

*Primary Examiner* — David M Brunsman
(74) *Attorney, Agent, or Firm* — Jackson Patent Law Office

(57) ABSTRACT

Ready-for-use film forming solid compositions for producing film coating dispersions for solid- or semisolid-form substances comprising a film forming ingredient of pregelatinized cereal or tuberous hydroxypropyl starches, fatty plasticizers, fillers of non pregelatinized modified and native starches and, substances for improving the final appearance of the film coating characterized in that the viscosity of said cold-regenerated solutions or dispersions is less than 1000 centipoises at a solid matter concentration greater than 20%, wherein said viscosity is obtainable by using natural film-forming agents which are cold-soluble and exhibit a low viscosity in an aqueous medium at high concentrations.

25 Claims, No Drawings

COATING AGENT

This application is a 371 filing of PCT/FR2006/051114, filed Oct. 26, 2006.

FIELD OF THE INVENTION

This invention relates to the pharmaceutical, cosmetic, nutraceutical and food fields and more specifically to the field of ready-to-use compositions designed for coating tablets, gel caps, capsules and other solid or semi-solid forms commonly used in these various fields of use.

DESCRIPTION OF THE PRIOR ART

Certain solid or semi-solid forms designed for oral, parenteral or another type of administration need to be isolated from the surrounding environment in order to:
prevent degradation over time of the active components, due to light, oxygen in the air, and moisture;
mask an unpleasant taste during absorption of the product;
mask an odor;
etc.

These solid or semi-solid forms are generally tablets of any form, gel caps, soft capsules, microgranules, granules, pastes (chewing gums), and so on.

The isolation of these forms from the external environment is achieved by providing a coating or film using various ingredients.

By "coating or film", we mean the formation of a continuous film on the surface of the solid or semi-solid form.

This deposition is generally done by spraying specific ingredients placed in solution or suspension in an aqueous or organic solvent.

These substances have the special feature of being film-forming agents.

By "film-forming agent", we mean substances that, when placed in solution, create a continuous film at the surface of a solid or semi-solid form, by evaporation of the solvent under the effect of a thermal phenomenon.

In most cases, the thermal phenomenon is an increase in temperature of the surrounding environment.

The thickness of said films deposited at the surface of the solid is on the order of the micron, and is dependent on the deposition provided on the support.

The film-forming agents commonly used are:
natural derivatives, such as:
cellulose: hydroxypropyl methylcellulose, hydroxypropyl cellulose, ethyl cellulose, etc.;
starch: maltodextrins, polydextrose, etc.;
synthetic polymers such as polyvinyl alcohols, polyvinylacetophthalates, methacrylic resins, etc.

These various substances can be used alone in an aqueous or organic solution or dispersion or in a mixture with other ingredients in order to reinforce the properties of the films formed.

Thus, the following are combined with film-forming agents:
plasticizers in order to give a certain elasticity to the film, thus avoiding cracking by retraction of the film when it dries;
fillers intended to increase the concentration of solid material in the film so as to reduce the drying time of the latter;
opacifiers in order to protect the active cores from light;
dyes in order to enhance the final appearance of the tablet;
etc.

These various compounds are added to ready-to-use preparations in highly variable amounts according to the objective.

Thus, a number of patents have been developed in the case of ready-to-use mixtures so as to facilitate the step of preparation of the coating solution or suspension.

Among these, we can cite the Colorcon patents:
U.S. Pat. No. 4,704,295, relating to a polyvinylacetophthalate-based film-coating;
European patent EP 0551700, protecting the use of cellulose and lactose in film-forming applications in the case of tablets intended for the pharmaceutical and confectionary fields;
U.S. Pat. No. 4,828,841, using maltodextrins as the film-forming agent in combination with an alginate derivative;
U.S. Pat. No. 4,802,924, based on the use of polydextrose in combination with an alginate derivative in order to reduce the caloric content of a sugar-based film very often used in confectionary.

Similarly, the Seppic company has protected a number of ready-to-use film-forming compositions of which the main ingredient is hydroxypropyl methylcellulose:
U.S. Pat. Nos. 5,393,333, 4,665,645, 4,576,646;
European patents EP 0523120 and EP 0133827.

These patents were filed for pharmaceutical uses, film-coated tablets and other solid pharmaceutical or dietetic forms, but also for agronomic uses, to protect seeds before germination.

The coating of solid or semi-solid forms of any type and in particular in the pharmaceutical, nutraceutical and cosmetic field remains a time-consuming and difficult operation.

Indeed, this operation involves sophisticated equipment such as coating turbines equipped with efficient heating and ventilation systems in order to ensure maximum evaporation of the spray solvent in the shortest possible time.

The process conditions are such that the spray flow rate and the heating temperature must prevent premature drying of the solution before it is deposited on the solid support.

The working temperatures are on the order of 35 to 45° C.

The duration of this operation is dependent on the content to be deposited on the solid support and the evaporation time of the solvent.

In most cases, the solvent is constituted by water.

Consequently, the higher the water content of the coating solution or suspension, the longer the evaporation time will be.

In the pharmaceutical and nutraceutical fields, the longer the time of exposure of products to heat, the greater the risk is of degradation of the active principles.

This operation can be reduced if the coating solutions or suspensions are highly concentrated with solid materials, and the amount of solvent to be evaporated is low.

However, in most cases, all of the patents cited above as well as in the specifications of suppliers of ready-to-use coating preparations, it is recommended to use said preparations at the concentration of solid materials in the film solution or suspension on the order of 10 to 20%, and preferably between 12 and 15% by weight with respect to the total preparation.

Consequently, the water in an amount of almost 85% must be evaporated in a relatively short time period, requiring a relatively short heating and highly efficient ventilation systems in the turbine. The temperature of the tablet bed is generally between 35 and 45° C.

To solve such a problem, it would be wise to increase the solid material concentration in the aqueous or organic phase. However, two problems arise depending on the nature of the film-forming agent.

Indeed, in the case of film-forming agents of natural origin, modified or not, or of synthetic origin, such as cellulose derivatives, the solid material concentration in the medium is limited by the viscosity of the latter. Ready-to-use suspensions at a concentration of 12 to 15% have a viscosity on the order of 1000 cPs, the maximum acceptable viscosity for the spray systems conventionally used for this type of preparation.

In the case of film-forming agents of synthetic origin, such as methacrylic resins, solutions or dispersion with an excessive solid material concentration cause the agglomeration of tablets in the turbine, because said solutions or suspensions have highly concentrated adhesive properties.

Thus, after an in-depth study of the literature in the field of ready-to-use film-coating compositions, no effective solution was found to reduce the film-coating time, due to the time necessary for the evaporation of a large amount of solvent, which, in most cases, is water.

DESCRIPTION OF THE INVENTION

On the basis of these facts, and in order to overcome the problems, the invention proposes ready-to-use solid film-forming compositions intended for producing film-coating solutions or dispersions for solid or semi-solid forms, which are remarkable in that the viscosity of these solutions or dispersions after cold reconstitution is below 1000 cP, for a solid material concentration greater than 20%, with this viscosity being obtained by the use of natural film-forming agents that are cold-soluble and that have a low viscosity in an aqueous medium for high concentrations, and the elasticity of the films being obtained by the addition of lipophilic plasticizers.

Thus, this invention is intended to develop film-forming compositions that, after spraying solutions or dispersions with high concentrations of said compositions, make it possible to obtain film-coatings similar in terms of physical properties to those obtained from cellulose solutions or dispersions in low concentrations, namely:

very good adhesion to the solid support;
- elasticity preventing any cracking by retraction or dilation of the film in the process and storage of the film-coated solid;
- good breakdown in neutral, acid and basic aqueous media.

This invention can also be applied to film-forming compositions intended to protect the support from light, atmospheric moisture, the oxidizing action of the air, or to mask a flavor and/or an odor, depending on the additives incorporated in said compositions. This invention is based on that fact that certain film-forming compositions that are cold-solubilized or dispersed in the spray solvent yield solutions or dispersions with a low viscosity, even for very high concentrations, unlike the celluloses such as hydroxypropyl methylcellulose.

Thus, even at high concentrations, the solutions or dispersions thus obtained by cold-production remain sprayable, without a risk of clogging the spray system. As the deposition on the surface of the support is greater in the same time period than with less-concentrated solutions, the working time is thus reduced, thereby limiting the risks of degradation of certain active principles.

By "sprayable", we mean that it is possible by administering pressurized air to said solutions or dispersions, to form a cloud of fine liquid droplets. These droplets are characterized in that their size and their wettability are such that they enable the formation of a very smooth and uniform film at the surface of the solid support, and the evaporation of the solvent is thereby facilitated.

The film-forming substances implemented are natural raw materials widely used in the pharmaceutical, cosmetic and dietetic fields.

DETAILED DESCRIPTION

Said ready-to-use film-forming compositions constituting the subject matter of the present invention use substances referred to as film-forming agents, which in an aqueous or organic solution result, after cold-solubilization, to preparations with low viscosities for high concentrations of solid materials.

These substances can be used alone, at a concentration of 25% or more in an aqueous solution, creating, after spraying, films having a certain resistance, in which the active substances can be dissolved or dispersed.

By "active substances", we mean substances that confer specific properties on the films resulting from said compositions, such as increased protection against moisture, resistance to gastric juices, modulated permeability, and so on.

These same substances can be used in combination with other so-called structuring vehicles, intended to reinforce the solidity of said film.

In combination with the structuring agents and/or the active substances, the film-forming agents of said compositions thus act as a "binder".

By "binder", we mean substances acting as cements between the particles of a network in order to consolidate a more or less solid structure.

Thus, these film-forming substances, owing to their binding property, ensure, when the film-coating solutions are sprayed, a uniform dispersion of the structuring agents and/or the active substances by their containment in the viscous network of said solutions.

Thus, the uniform distribution of these various constituents at the surface of the solid confers increased solidity or specific optimized properties on the film thus formed, depending on the concentration of said constituents.

The film-forming agents making it possible to obtain said ready-to-use compositions and acting as a "binder" belong to the class of natural polymers: polysaccharides.

The polysaccharides used in the context of this invention are starches.

Starches are glucose polymers. These molecules have one of two types of chains:

- linear: amylose
- branched: amylopectin

Generally, so-called native starches, such as starches extracted from plants, are a mixture of these two structures.

According to their origin, the proportion of these two polymers varies as shown in the table below.

| | AMYLOSE % | AMYLOPECTIN % |
|---|---|---|
| Corn | 25% | 75% |
| Waxy maize | 1-5% | 95-99% |
| Wheat | 25% | 75% |
| Potato | 20% | 80% |
| Tapioca | 17% | 83% |
| Amylose-rich corn | 50-70% | 30-50% |

In their natural form, native starches do not have film-forming properties when they are dispersed in cold water. They remain in particulate form.

It is only by heating the starch grains in the presence of water that their thickening property is developed. This is the starch gelatinization step. There is a breakdown of said grains, thus allowing for complete hydration of the polymer and the formation of a colloidal solution. This hydration physically involves an increase in the viscosity of the solution that, by cooling, creates a gel over time. This is the phenomenon of retrogradation.

However, these gels are relatively non-solid and release water from the network by syneresis.

These solutions are generally hot sprayed on the solid support. The films obtained under these conditions are brittle and rarely transparent.

The solidity of these films is dependent on the amylose concentration in the starch retained. Amylose-rich starches are more suitable for forming solid films than amylopectin-rich starches, but the viscosity of such solutions is very high even at low concentrations.

A certain number of patents have been considered in this field, such as patent WO 0200205, which implements a pregelatinized acetyl starch with a high amylose content. The spray solutions must first be heated between 50 and 60° C., and the concentration thereof is no greater than 25%. The patent of Upjohn, GB 810 306, implements an amylose acetophthalate with a high solution content. This type of starch leads to the formation of gastro-resistant films, non-soluble in an acid medium.

Moreover, native starch solutions have very high viscosities for low concentrations.

Depending on the type of starch, the gelatinization temperatures, the appearance of the films and the retrogradation phenomenon vary. This data is presented in the table below.

| TYPE OF STARCH | GELATINIZATION TEMPERATURE | APPEARANCE OF THE PASTE | | | RETROGRADATION |
|---|---|---|---|---|---|
| | | Viscosity | Texture | Appearance of film | |
| Corn | 62-80° C. | Average | Short | Opaque | High |
| Waxy maize | 63-72° C. | Average | Long | Moderately light | Low |
| Wheat | 52-85° C. | Low | Short | Translucent | High |
| Potato | 58-65° C. | High | Long | Transparent | Average |
| Tapioca | 60-65° C. | High | Long | Very transparent | Low |

Thus, in their natural state, the native starches cannot be used for highly concentrated film-forming compositions for coating solid forms in the pharmaceutical, cosmetic and nutraceutical fields due to:
  the need to heat the solutions so as to enable the starch grains to hydrate and develop their film-forming properties. The temperatures used are higher than the gelatinization temperatures;
  a high viscosity for low concentrations used.

However, the food field, faced with the same problems mentioned above, enables a certain number of so-called modified starches to be developed in order to solve these problems.

The native starches are subjected to several types of modifications.
  These can be:
  physical,
  chemical, or
  enzymatic.
  Combinations of these various modifications are also possible. The most widely used physical modification is the transformation of the native starch into a pregelatinized starch. This modification results in the elimination of the step of heating the starch solution in order to fully hydrate the glucose polymer. Consequently, placed in cold water, the starch instantaneously leads to the formation of a solution having a certain viscosity.

At the chemical level, the starches can be subjected to:
  substitution reactions resulting in:
    cross-linked starches: creation of connections between two polymer chains;
    esterified and etherified starches: substitution of an OH grouping of the polymer chain by hydroxypropyl, hydroxyethyl or acetyl groupings;
    starches substituted by chemical groups such as octenyl sodium succinate.
  These starches have the special feature of having a very low retrogradation power.
  hydrolysis reactions resulting in starches having short polymer chains:
    dextrins: starch having undergone depolymerization, then recombined as short-chain branched polymers. These starches do not show the retrogradation phenomenon;
    hydrolyzed starches resulting in non-branched short-chain polymers. These starches have a strong retrogradation power.
  These starches can subsequently be subjected to substitution reactions as defined above.
  oxidation reactions leading to the substitution of hydroxyl groups with COOH or CO groups.

In these oxidation reactions, there is a depolymerization of the starches, generating molecules having polymer short chains. These starches do not have the retrogradation phenomenon due to the steric hindrance of the COOH and CO groups, thus preventing the formation of hydrogen bonds between the polymer chains.

At the enzymatic level, the starches are subjected to hydrolysis. The molecules thus obtained are called maltodextrins. Depending on the intensity of the enzymatic hydrolysis, there are various types of maltodextrins defined by the number of dextrose molecules present on the polymer chain. These molecules are cold-soluble in water and result in solutions having a very low viscosity.

Aside from the enzymatic reactions, all of the other chemical reactions are produced on the starch grain itself. Consequently, it is possible to combine the physical, pregelatinization modification and the chemical modification.

Thus, a single substituted starch can be presented:
  in the classic form: substituted starch;
  and in the pregelatinized form: substituted pregelatinized starch.

In the first case, it will be necessary to heat the solution in order to obtain a colloidal solution, but at a temperature below that of the native starch, owing to the chemical modification performed on the grain.

In the second case, the simple dispersion of the substituted starch pregelatinized in cold water will result in the formation of the colloidal solution.

All of these starches have film-forming properties, of which some are used in the food industry to give a glossy appearance to the end product, such as snack pastries.

Thus, among these various types of modified starches cited above, substituted starches have been used in the present invention, including esterified and etherified, pregelatinized or non-pregelatinized starches.

Compared with native starches, these substituted starches have a low viscosity in an aqueous medium for a high concentration. As an example, a cornstarch hydroxypropyl at a concentration of 15% in water results in a viscosity on the order of 150 cPs.

Such solutions are easy to spray on solid supports such as tablets, gel caps, and so on.

Moreover, the pregelatinized form enables cold-solubilization of this starch in water.

Compared with classic hydroxypropyl methylcellulose film-forming solutions at the same concentration, the viscosities of the latter are clearly higher, as indicated in the table below, thus making it impossible to increase the solid material content of said solutions.

| Concentrations | Pharmacoat 645 | Pharmacoat 606 | Pharmacoat 615 |
|---|---|---|---|
| 2% | 4.50 cPs | 6.00 cPs | 15.00 cPs |
| 4% | 12.50 cPs | 22.50 cPs | 90.00 cPs |
| 6% | 32.00 cPs | 65.00 cPs | 350.00 cPs |
| 8% | 75.00 cPs | 170.00 cPs | 1100.00 cPs |
| 10% | 175.00 cPs | 350.00 cPs | 2500.00 cPs |
| 12% | 300.00 cPs | 650.00 cPs | / |
| 14% | 550.00 cPs | 1200.00 cPs | / |

The method of film-coating solid forms in the pharmaceutical field is based on the dispersion of a more or less viscous film-forming solution in the form of a mist formed by very fine droplets. This mist is obtained by compressed air, which acts:
  on the one hand, by forming said solution through an aperture of predetermined size;
  on the other hand, by scattering the jet arriving more or less perpendicularly on each side of the liquid jet.

Under such conditions, the liquid flow rate is on the order of 9 g/mn through an aperture of 1.2 mm, and the pressure of the air scattering the liquid jet is on the order of 2 to 3 bars.

It is thus easy to understand that, if the viscosity of the film-forming solutions increases, the pressure of the air applied to the latter will have to be even greater in order to scatter a more compact product. Moreover, to maintain the same flow rate, it will be necessary to increase the size of the aperture of the spray nozzle. However, this can be done only at the expense of the fineness of the final mist.

Therefore, for concentrations with more than 12% solid material in the classic hydroxypropyl methylcellulose-based film-coating solutions, it becomes impossible to spray because the viscosities get too high to obtain a fine enough mist. The viscosity limit not to be exceeded, conventionally set with hydroxypropyl methylcellulose solutions, is 1200 cPs for a spraying air pressure on the order of 3 bars.

However, in the case of hydroxypropyl starch, the solutions have relatively low viscosities for high concentrations.

| CONCENTRATIONS | VISCOSITIES |
|---|---|
| 5% | 15.03 cPs |
| 10% | 36.12 cPs |
| 15% | 148.72 cPs |
| 20% | 556.66 cPs |
| 25% | 2829.16 cPs |
| 30% | 7988.88 cPs |

Consequently, in combination with other ingredients having no influence on their viscosity, it will be possible to increase the solid material concentration of the medium.

This is demonstrated in the following compositions:
  a solution with 20% hydroxypropyl starch (Dispersion 1);
  a solution with 18% pregelatinized hydroxypropyl starch, 6.0% hydroxypropyl starch, 1.5% glycerol dibehenate, and 4.5% titanium dioxide (Dispersion 2).

In both cases, the solutions were cold-produced using a blade stirrer rotating at 700 rpm. The stirring time was set at 120 minutes in order to ensure perfect hydration of the polymer. The viscosity of these two solutions was determined with a Brookfield viscosimeter, model RVT, using a mobile no. 3, rotating at a speed of 20 rpm. The measurements were taken at a temperature of 20° C.

As expected, the highly-concentrated hydroxypropyl starch-based solutions have viscosities conforming to the properties established for film-coating solutions.

|  | Hydroxypropyl starch |
|---|---|
| Dispersion 1 | 556.66 cPs |
| Dispersion 2 | 650.00 cPs |

While modified starches, including hydroxypropyl starches, are the subject of a certain number of patents in a wide range of fields other than pharmacy, cosmetics and dietetics, they are not commonly used to produce film-coating solutions in the pharmaceutical field, and even less in the composition of ready-to-use film-forming preparations.

As an example, hydroxypropyl starch is used in the composition of adhesives for a display on a support, as described in U.S. Pat. No. 4,837,314.

In the field of ready-to-use compositions, we can cite, inter alia, the European patent EP 0819387 for a chewing gum coating. This patent uses hydroxypropyl tapioca starch, which has previously been subjected to hydrolysis in order to reduce the length of the chains. The degree of substitution of the OH groups with hydroxypropyl groups is between 0.05 and 0.20. The solid material concentration in the film-coating solution is between 5 and 60%. The production of this solution requires it to be brought to between 60 and 70° C. before it is sprayed, and requires the temperature to be maintained at between 30 and 50° C. during spraying. These solutions are used without additives because the films obtained have good elasticity, good glossiness and a very good core-insulating effect.

The second patent referring to hydroxypropyl starch as a film-forming agent is the patent of Roquette, FR 2862654. The hydroxypropyl starch used in the present invention is a hydroxypropyl starch rich in amylose, obtained from legumes such as the garden pea, the green beans, beans and fava beans.

Roquette protects an amylaceous film-forming composition containing a modified legume starch, a plasticizer and water, with the film-forming agent being a modified starch. The amylose content in this composition is between 25 and 45% dry weight with respect to the starch dry weight.

Roquette protects this film-forming composition for various uses such as film-coating tablets, the production of aromatic films, the production of soft or hard capsules, and so on.

Therefore, Roquette claims a pea starch content in the film-forming composition of between 10 and 90%, because a person skilled in the art knows that, for the various uses cited above, the film-forming concentration will vary. In the case of the use of the film-forming composition for film-coating, Roquette protects a solution having a modified starch concentration of 10 to 15%, and preferably a liquid film-forming composition containing 10% solid material, resulting in a viscosity below 500 cPs at 25° C. The 10% dry material includes the pea starch and the plasticizer. With the plasticizer content ranging from 2.5 to 30% by weight with respect to the total weight of the starch used, it easily appears that the actual starch content varies from 5.50 to 9.75%.

In addition, the method described for producing the film-coating solution recommends heating to 90° C., and the film-forming solution is kept at 55° C. for the entire spraying operation.

Thus, in the European patent EP 0819387 and that of Roquette, it appears to be necessary to heat the film-coating composition before use, in spite of the use of hydroxypropyl starch.

However, in the present invention, the film-coating solution is cold-produced. This is based on the careful choice of modified starches used in the composition. Thus, unlike in the Roquette patent, the hydroxypropyl starches have been chosen from grain plants, such as corn, rice, wheat, as well as certain tuberoses such as potato and tapioca, with the preference going to hydroxypropyl corn starch, genetically transformed or not, with the "amylose-rich" quality not having been retained. All of these starches have amylose contents below or equal to 25%, and therefore do not meet the criteria of the Roquette patent, of greater than 25%, and make it possible to obtain non-viscous solutions while preserving their film-forming properties owing to the low amylose content and a careful choice of additives.

Regardless of the plant origin, the hydroxypropyl starch used in the present invention has a degree of substitution (Ds) of between 0.05 to 0.20, with this degree of substitution corresponding to the average number of hydroxypropyl groups substituted for 10 anhydroglucose units. In addition, this hydroxypropyl starch may have been subjected before grafting to a physical modification, pregelatinization, and/or a chemical modification such as partial hydrolysis.

The hydroxypropyl starch concentration in the present ready-to-use solid composition is greater than 50%. Preference is given to a ready-to-use composition containing 70 to 95% by weight hydroxypropyl starch, with respect to the total weight of the film-forming composition. Taking into account that, in the present invention, the solid material content of the film-coating solutions or dispersions reconstituted from said compositions can contain 25 to 35% dry material by weight with respect to the total weight of the solution, the hydroxypropyl starch concentration is therefore between 17.5 and 33.25%, a content that is clearly greater than that protected by Roquette, i.e. 5.50 to 9.75% by weight with respect to the total weight of the solution, for film-forming compositions used for film-coating.

In general, the ready-to-use film-forming compositions contain, in addition to the basic film-forming agent:

filler substances facilitating the film-coating;
substances increasing the elasticity of the film;
substances improving the final appearance of the film-coating;
substances conferring specific properties on the film.

It has been demonstrated that the addition of certain ingredients to the film-coating solution facilitated the film-coating, such as faster solidification or a reduced drying time. These substances are qualified in the present case as "fillers".

By "fillers", we mean all substances capable of being incorporated in the meshes of the film-forming network without modifying the structure and physical properties thereof. These substances are qualified as inert. They are there only to increase the dry material content of the film-forming solution without modifying the final properties of the latter. Generally, these substances are insoluble or only slightly soluble in the solubilization medium of the film-forming agent. Among the substances capable of acting in this way, the following have been used in the present invention: microcrystalline cellulose, lactose, native starches and non-pregelatinized modified starches. Preferably, the native starches and non-pregelatinized modified starches such as maltodextrins have been retained. The concentration of these starches can range from 0.1 to 50% by with respect to the total weight of the ready-to-use film-forming composition. Concerning the elasticity of the films, this criterion is very important in the case of the film-coating. Indeed, any film-forming substance can be used in the case of a film-coating for solid forms. However, as is, most of them have a high retraction power on drying. This retraction results from evaporation of the water contained between the polymer chains of the film-forming agent. Consequently, on the sharp corners of the tablets, the film-coating detaches from its support by cracking.

In the case of soft capsules considered to be solid forms, the elasticity of the film is essential due to the potential deformation of the capsule under the effect of pressure. Thus, the film deposited at the surface of the capsule must have the ability to undergo a deformation without breaking.

To overcome this disadvantage, substances qualified as plasticizers are added to the film-coating solution. They are inserted between the film-forming polymer chain by forming hydrogen bonds, as do the water molecules. However, during drying, these molecules are not evaporated and create a more flexible network. Among the substances capable of acting in this way in the present invention are hydrophilic plasticizers such as glycerol, sorbitol, sorbitol anhydrides, polyoxyethylene glycol, triethylcitrate, propylene glycol, and so on.

However, combined with the starches, whether modified or not, most of these plasticizers result in more or less adhesive coating films due to the strong hygroscopicity of these film-forming agents. Thus, to overcome this disadvantage, fatty-chain molecules with electro-attractor groups have been retained, thus enabling the formation of hydrogen bonds with the polymer chains of the film-forming agent.

By "electro-attractor" groups, we mean all chemical groups, positively or negatively charged, facilitating the creation of low-energy chemical bonds, such as hydrogen bonds. Among these groups, those containing hydrogen or oxygen atoms have been retained. These substances are even more beneficial since, aside from the formation of hydrogen bonds with the polymer chains, they react in particular with amylose to form complexes leading, depending on the concentration, to the gelatinization of the starch as observed with gelatin. This reaction is very well known to a person skilled in the art in the bread-making industry. Consequently, for low concentrations of lipophilic plasticizers, the film-forming power of the hydroxypropyl starch is reinforced. The following chemical families have been retained as lipophilic plasticizers meeting the aforementioned criteria:
- glycerol derivatives:
    - fatty acid esters of glycerol
    - fatty acid esters of polyglycerol
    - fatty acid esters of polyoxyethylene glycerol
    - fatty acid esters of substituted glycerol
- glycol derivatives:
    - fatty acid esters of glycol
    - fatty acid esters of propylene glycol
    - fatty acid esters of polyoxyethylene glycol
    - fatty alcohol esters of polyoxyethylene glycol
    - fatty acid esters of ethylene glycol
    - fatty acid esters of diethylene glycol
- polyol derivatives:
    - sorbitanes (laurate, oleate, palmitate, stearate, trioleate)
    - fatty acid sucro-esters
- plant oil derivatives such as castor oil, soya bean oil, etc.:
    - simple and/or hydroxylated
    - simple hydroxylated and/or hydrogenated
    - simple and/or hydroxylated and/or hydrogenated and/or polyoxyethylenated
- diacid and alcohol diesters such as butyl sebacate, etc.

Among the fatty acids capable of acting as fatty chains in the lipophilic plasticizers retained, we prefer stearic, cetostearic, caprylocapric, oleic, lauric, linolenic, linoleic, myristic, palmitic, behenic, undecylenic, and ricinoleic acids.

The fatty chains can also be fatty alcohols of the corresponding fatty acids mentioned above. Within the same family, these plasticizers can be used alone or in combination, such as the glycerol monostearate/glycerol monopalmitate mixture. Depending on their reactivity with the hydroxypropyl starch implemented, the lipophilic plasticizer content varies from 0.1% to 50% by weight with respect to the weight of the starch implemented, with this reactivity being depending on the amylose concentration contained in the hydroxypropyl starch.

In addition, to reduce the adhesive aspect of the film-coating due to the classic hydrophilic plasticizers, the latter can be combined carefully with lipophilic plasticizers.

The proportions retained in this particular case range from 1:99 to 99:1 with respect to the total weight of plasticizers implemented.

Whether they are hydrophilic or lipophilic plasticizers, some of them are in the liquid state, such as glycerin. Consequently, their addition, as is, to ready-to-use film-coating compositions is not possible. The problem has been bypassed by binding them to solid supports having the special feature of releasing them in the liquid medium. These supports are of mineral origin with a very high absorbing power, such as silica, colloidal, levilite, magnesium aluminosilicate, dibasic anhydrous calcium phosphate, etc.

The percentage of binding of the plasticizer to this support is dependent on the porosity of the support implemented. Thus, it can range from 1% to 60% by weight with respect to the total weight of the support.

In the ready-to-use film-forming composition, the percentage of the plasticizer/support mixture to be incorporated will vary according to the desired elasticity of the film. It can range from 5 to 40% by weight with respect to the total weight of the film-forming composition.

Aside from the production of colorless films in order to give a final gloss to the tablet or other solid supports, the ready-to-use compositions can contain opacifiers such as titanium oxide and talc, as well as dyes used in pure state or bound to supports such as alumina hydrates. The iron oxides are also retained as dyes, as are purely natural dyes such as betanin, chlorophyll, riboflavin, caramel, and so on.

Whether it is titanium oxide, talc or dyes, the concentration thereof in the medium depends on the desired effect. This varies, according to the type of dye, from 0.1% to 30% by weight with respect to the total weight of the ready-to-use composition.

In general, the film-coating of the solid forms such as tablets is intended to insulate the core from the external environment. Films containing titanium oxide, aside from the fact that the latter has a non-negligible coating power and uniformly distributes the dye, protect the sensitive active principles from light.

In the present invention, the use of certain substances makes it possible to confer other physicochemical on the films, such as:
- masking of odors by the use of flavoring substances having a pronounced flavored component, such as mint, citrus fruits, certain red fruits,
- a barrier effect against moisture by the implementation of hydrophobic substances such as:
    - fatty acids: stearic, palmitic, oleic acids, etc.
    - fatty alcohols: cetylic, stearylic alcohol, etc.
    - silicones
- an improvement in the gliding effect when a tablet film-coating has a very low radius of curvature. This property is obtained by incorporating, in the film, a gliding agent belonging to the family of mica titanium, a mixture of potassium aluminum silicate and titanium.

Regardless of the desired effect, flavor masking, moisture protection barrier, and improvement of the gliding power, the concentration of these various substances ranges from 0.1% to 20% by weight with respect to the total weight of the ready-to-use film-forming composition.

Generally, the ready-to-use film-forming composition is intended to be dispersed in an aqueous medium. Unlike in the patents cited above, the use of said compositions in solution or dispersion is done by cold-production and over a relatively short time period, i.e. 20 to 30 minutes. The water content used in this dispersion ranges from 80% to 60% by weight with respect to the total weight of the film-forming dispersion, and preferably between 75% and 55%. The viscosity of such dispersions, determined at 20° C. using a Brookfield viscosimeter, mobile no. 3, speed 20, is between 150 and 900 cPs.

Unlike the classic hydroxypropyl methylcellulose dispersion at a concentration of 12 to 15%, these dispersions of the present invention have, at the concentrations claimed, the special feature of being thixotropic, resulting in a very high physical stability of the dispersions at rest: absence of settling of the insoluble components contained in the preparation.

By "thixotropic", we mean the property of certain viscous preparations to liquefy rapidly (drop in viscosity) under the effect of more or less intense mechanical stirring, and of restoring a pseudo-solid appearance (increase in viscosity) when the stirring is stopped.

In addition, owing to the high solid material concentration in the reconstituted dispersion leading to a decrease in the evaporation temperature of the water from 40° C. to 30-32° C., these film-forming compositions are perfectly suitable for the film-coating of soft capsules in an aqueous medium. Indeed, the film-coating of soft capsules can currently be done only in an alcoholic medium due to the reactivity of the gelatin:
- to excessive amounts of water implemented in the film-coating with hydroxypropyl methylcellulose solutions, resulting in the solubilization thereof, and to a temperature above 40° C. implemented in order to evaporate the high water content, thus causing solidification of the capsules by melting of the gelatin.

The following examples of ready-to-use compositions are possible formulas of compositions according to the present invention, and they do not constitute restrictions of any sort.

EXAMPLE 1

Film-Forming Composition

| | |
|---|---|
| Pregelatinized hydroxypropyl starch | 600 g |
| Hydroxypropyl starch | 150 g |
| Glycerol dibehenate | 100 g |
| Titanium dioxide | 100 g |
| Orange/grapefruit flavor | 50 g |
| Quinoline yellow | QS |

For the film-coating of 6 kg of tablets with a dry deposit of 5%, a dispersion at 30% of the ready-to-use composition described above was performed:
In a 1-liter beaker, introducing 770 ml* of demineralized water.
Stirring the medium at 700 rpm using a blade.
Gradually introducing 330 g* of the mixture described in "Example 1".
Continuing the stirring for 30 minutes.
  10% were added to compensate for production losses.
The viscosity of the solution at 20° C. determined with mobile 3 at a speed of 20 rpm is 355 cPs.
Before spraying, the tablets were preheated to 30° C.
During the spraying, the working parameters were established:
  spray flow rate between 12 and 16 g/mn
  spray pressure between 2.5 and 3 bars
  working temperature between 27° C. and 32° C.
  film-coating time: 90 minutes.
The tablets obtained after film-coating have a very smooth, glossy appearance with very good adhesion of the film to the core. Using a scalpel, it was not possible to separate the film from the solid support.

EXAMPLE 2

Film-Forming Dispersion at 25% for 6 kg of Tablets

| | |
|---|---|
| Pregelatinized hydroxypropyl starch | 198.0 g |
| Hydroxypropyl starch | 49.5 g |
| Glycerol dibehenate | 16.5 g |
| Titanium dioxide | 49.5 g |
| Mint flavor | 16.5 g |
| Purified water | 990.0 g |
| Quinoline yellow | QS |
| Patent blue | QS |

Weighing the various ingredients of the formula.
Mixing the various components together, except for the titanium dioxide.
In a 2-liter beaker, introducing 990 ml of demineralized water.
Stirring the medium at 700 rpm using a blade.
Gradually introducing the titanium dioxide.
Stirring for 3 to 5 minutes.
Then gradually introducing the mixture of the various components. Adding the dyes last.
Continuing the stirring for 30 minutes.
The viscosity of the solution at 20° C. determined with mobile 3 at a speed of 20 rpm is 300 cPs.
Before spraying, the tablets were preheated to 30° C.
During the spraying, the working parameters were established:
  spray flow rate between 14 and 18 g/mn
  spray pressure between 2 and 2.5 bars
  working temperature between 27° C. and 32° C.
  film-coating time: 90 minutes.

EXAMPLE 3

Film-Forming Dispersion at 30% for 6 kg of Tablets

| | |
|---|---|
| Pregelatinized hydroxypropyl starch | 198.0 g |
| Hydroxypropyl starch | 66.0 g |
| Glycerol dibehenate | 16.5 g |
| Titanium dioxide | 49.5 g |
| Purified water | 770.0 g |
| Red iron oxide | QS |

Weighing the various ingredients of the formula.
Mixing the various components together, except for the titanium dioxide.
In a 1-liter beaker, introducing 770 ml of demineralized water.
Stirring the medium at 700 rpm using a blade.
Gradually introducing the titanium dioxide and the red iron oxide.
Stirring for 3 to 5 minutes until total dispersion of the red iron oxide.
Then gradually introducing the mixture of the various components. Continuing the stirring for 30 minutes.
The viscosity of the solution at 20° C. determined with mobile 3 at a speed of 20 rpm is 475 cPs.
Before spraying, the tablets were preheated to 30° C.
During the spraying, the working parameters were established:
  spray flow rate between 14 and 16 g/mn
  spray pressure between 2.5 and 3 bars
  working temperature between 27° C. and 32° C.
  film-coating time: 90 minutes.
The tablets obtained after film-coating have a very smooth, glossy appearance with very good adhesion of the film to the core.

EXAMPLE 4

Film-Forming Dispersion at 30% for 6 kg of Tablets

| | |
|---|---|
| Pregelatinized hydroxypropyl starch | 222.75 g |
| Hydroxypropyl starch | 90.75 g |
| Glycerol dibehenate | 16.50 g |
| Purified water | 770.0 g |
| Patent blue | QS |
| Sunset yellow | QS |
| Quinoline yellow | QS |

Weighing the various ingredients of the formula.
Mixing the various components together.
In a 1-liter beaker, introducing 770 ml of demineralized water.

Stirring the medium at 700 rpm using a blade.
Gradually introducing the mixture of the various components.
Adding the dyes last.
Continuing the stirring for 30 minutes.
The viscosity of the solution at 20° C. determined with mobile 3 at a speed of 20 rpm is 650 cPs.
Before spraying, the tablets were preheated to 30° C.
During the spraying, the working parameters were established:
- spray flow rate between 14 and 16 g/mn
- spray pressure between 2.5 and 3 bars
- working temperature between 27° C. and 32° C.
- film-coating time: 90 minutes.

The tablets obtained after film-coating have a very smooth, glossy appearance with very good adhesion of the film to the core. In spite of the absence of titanium dioxide in the composition, the coloring of the tablets is uniform.

EXAMPLE 5

Film-Forming Dispersion at 30% for 6 kg of Tablets

| | |
|---|---|
| Pregelatinized hydroxypropyl starch | 181.50 g |
| Hydroxypropyl starch | 92.40 g |
| Glycerol dibehenate | 16.50 g |
| Stearic acid | 39.60 g |
| Purified water | 770.0 g |
| Indigo carmine | QS |
| Erythrosine | QS |

Weighing the various ingredients of the formula.
Mixing the various components together.
In a 1-liter beaker, introducing 770 ml of demineralized water.
Stirring the medium at 700 rpm using a blade.
Gradually introducing the mixture of the various components.
Adding the dyes last.
Continuing the stirring for 30 minutes.
The viscosity of the solution at 20° C. determined with mobile 3 at a speed of 20 rpm is 875 cPs.
Before spraying, the tablets were preheated to 30° C.
During the spraying, the working parameters were established:
- spray flow rate between 12 and 14 g/mn
- spray pressure between 3 and 4 bars
- working temperature between 27° C. and 32° C.
- film-coating time: 80 minutes.

The tablets obtained after film-coating have a very smooth, glossy appearance with very good adhesion of the film to the core. In spite of the absence of titanium dioxide in the composition, the coloring of the tablets is uniform.

EXAMPLE 6

Film-Forming Dispersion at 30% for 6 kg of Tablets

| | |
|---|---|
| Pregelatinized hydroxypropyl starch | 181.5 g |
| Hydroxypropyl starch | 49.5 g |
| Glycerol dibehenate | 16.5 g |
| Titanium dioxide | 49.5 g |
| Stearic acid | 33.0 g |
| Purified water | 770.0 g |
| Red iron oxide | QS |

Weighing the various ingredients of the formula.
Mixing the various components together, except for the titanium dioxide.
In a 1-liter beaker, introducing 770 ml of demineralized water.
Stirring the medium at 700 rpm using a blade.
Gradually introducing the titanium dioxide and the red iron oxide.
Stirring for 3 to 5 minutes until total dispersion of the red iron oxide.
Then gradually introducing the mixture of the various components.
Continuing the stirring for 30 minutes.
The viscosity of the solution at 20° C. determined with mobile 3 at a speed of 20 rpm is 700 cPs.
Before spraying, the tablets were preheated to 30° C.
During the spraying, the working parameters were established:
- spray flow rate between 14 and 18 g/mn
- spray pressure between 2.5 and 3 bars
- working temperature between 27° C. and 32° C.
- film-coating time: 60 minutes.

The tablets obtained after film-coating have a very smooth, glossy appearance with very good adhesion of the film to the core.

EXAMPLE 7

Film-Forming Dispersion at 30% for 2 kg of Soft Capsules

| | |
|---|---|
| Pregelatinized hydroxypropyl starch | 53.0 g |
| Stearic acid | 17.0 g |
| Glycerin | 20.0 g |
| Candurin ® | 10.0 g |
| Purified water | 233.3 g |

Weighing the various ingredients of the formula.
Mixing the various components together, except for the glycerin.
In a 500-ml beaker, introducing 233.3 ml of demineralized water.
Adding the glycerin.
Stirring the medium at 700 rpm using a blade.
Stirring for 3 to 5 minutes.
Gradually introducing the mixture of the various components.
Continuing the stirring for 30 minutes.
The viscosity of the solution at 20° C. determined with mobile 3 at a speed of 20 rpm is 700 cPs.
Before spraying, the capsules were washed with alcohol and preheated to 30° C.
During the spraying, the working parameters were established:
- spray flow rate between 14 and 18 g/mn
- spray pressure between 2.5 and 3 bars
- working temperature between 27° C. and 32° C.
- film-coating time: 60 minutes.

The soft capsules obtained after film-coating have a very smooth, glossy appearance with very good adhesion of the film to the core.

The invention claimed is:
1. A ready to use film forming solid composition for producing film coating dispersions for solid or semi-solid forms, the composition comprising:
   i) a film forming ingredient selected from the group consisting of pregelatinized cereal and tuberous hydroxypropyl starches, and including an amylose concentration equal to or less than 25% by weight with respect to a total weight of starch in the film forming, ingredient, and soluble in cold water;
   ii) fatty plasticizers enhancing the film forming properties of the pregelatinized hydroxypropyl starches;
   iii) fillers selected from the group consisting of non pre-gelatinized modified starches and natives starches; and
   iv) substances improving the final appearance of the film coating and conferring specific properties to the film,
wherein a viscosity of these dispersions after reconstitution at approximately 20° C., is below 1000 cPs, for a solid material concentration greater than 20%.

2. A ready to use film forming solid composition according to claim 1, characterized in that the cereal and tuberous pregelatinized hydroxypropyl starches, native starches and non pre-gelatinized modified starches are selected from the group consisting of corn, wheat, potato, tapioca and rice starches.

3. A ready to use film forming solid composition according to claim 2, characterized in that the film forming ingredient includes hydroxypropyl corn starch.

4. A ready to use film forming solid composition according to claim 1, characterized in that substances improving the appearance and conferring special properties are selected from the group consisting of hydrophilic plasticizers, dyes, odor maskers, protectors against moisture, and gliding agents.

5. A ready to use film forming solid composition according to claim 4, characterized in that proportion of hydrophilic plasticizers and fatty plasticizers varies from 1:99 to 99:1 with respect to the total weight of hydrophilic and fatty plasticizers.

6. A ready to use film forming solid composition according to claim 4, characterized in that the fatty plasticizers and hydrophilic plasticizers are bound to solid supports.

7. A ready to use film forming solid composition according to claim 6, characterized in that the solid supports are selected from the group consisting of colloidal silica, levilite, magnesium aluminosilicate, and dibasic calcium phosphate.

8. A ready to use film forming solid composition according to claim 6, characterized in that the percentage of plasticizers bonded to the solid supports is between 1% and 60% by weight with respect to the total weight of the solid supports.

9. A ready to use film forming solid composition according to claim 6, characterized in that the percentage of plasticizers bonded to the solid supports is between 5% and 40% by weight with respect to the total weight of the film forming composition.

10. A ready to use film forming solid composition according to claim 4, characterized in that the hydrophilic plasticizers are selected from the group consisting of glycerol, sorbitol, sorbitol anhydrides, polyoxyethylene glycol, triethylcitrate and propylene glycol.

11. A ready to use film forming solid composition according to claim 4, characterized in that the dyes are selected from the group consisting of natural dyes or synthetic dyes.

12. A ready to use film forming solid composition according to claim 11, characterized in that the dye content is between 0.1% and 30% by weight with respect to the total weight of the composition.

13. A ready to use film forming solid composition according to claim 4, characterized in that the odor maskers are flavors.

14. A ready to use film forming solid composition according to claim 4, characterized in that the protectors against moisture are selected from the group consisting of fatty acids, fatty alcohols and silicone oils.

15. A ready to use film forming solid composition according to claim 4, characterized in that the concentrations of odor maskers, protectors against moisture, and gliding agents are between 0.05 and 20% by weight with respect to the total weight of the composition.

16. A ready to use film forming solid composition according to claim 1, characterized in that the degree of substitution of cereal and tuberous hydroxypropyl starches is between 0.05 and 0.2.

17. A ready to use film forming solid composition according to claim 1, characterized in that the total of modified starch content is greater than 50% by weight with respect to the total weight of the composition.

18. A ready to use film forming solid composition according to claim 1, characterized in that the total modified starch content is between 70 and 95% by weight with respect to the total weight of the composition.

19. A ready to use film forming solid composition according to claim 1, characterized in that the filler content is between 0.1 and 50% by weight with respect to the total weight of the composition.

20. A ready to use film forming solid composition according to claim 1, characterized in that the fatty plasticizers are selected from the group consisting of, glycerol fatty acid esters, glycol fatty acid esters, sorbitanes, fatty acid sucro esters, plant oils, and hydrogenated, hydroxylated, or polyoxyethylenated derivatives of plant oils, and diacid and alcohol diesters.

21. A ready to use film forming solid composition according to claim 20, characterized in that the fatty acid chains of the glycerol or glycol fatty acid esters are selected from the group consisting of stearic cetostearic, caprylocapric, oleic, lauric, linolenic, linoleic, myristic, palmitic, behenic, undecylenic, and ricinoleic acids or alcohols.

22. A ready to use film forming solid composition according to claim 1, characterized in that the fatty plasticizer content is between 0.1 and 50% by weight with respect to the total weight of hydroxypropyl starch and fillers.

23. A ready to use film forming solid composition according to claim 1, characterized in that they contain gliding agents which are mica-titanium.

24. A ready to use film forming solid composition according to claim 1, configured to produce below 1000 cPs viscosity of the film coating dispersions after reconstitution, for a solid material concentration of thereof, between 25% and 45% by weight with respect to the total weight of the dispersions.

25. A ready to use film forming solid composition according to claim 1, characterized in that the viscosity of the film coating dispersions after reconstitution, is between 150 and 900 cPs at a temperature of 20° C.

* * * * *